Nov. 10, 1953  D. M. KITTERMAN  2,658,538
SCREW-RETAINING CLAMP FOR POWER-DRIVEN SCREW DRIVERS
Filed Oct. 29, 1951
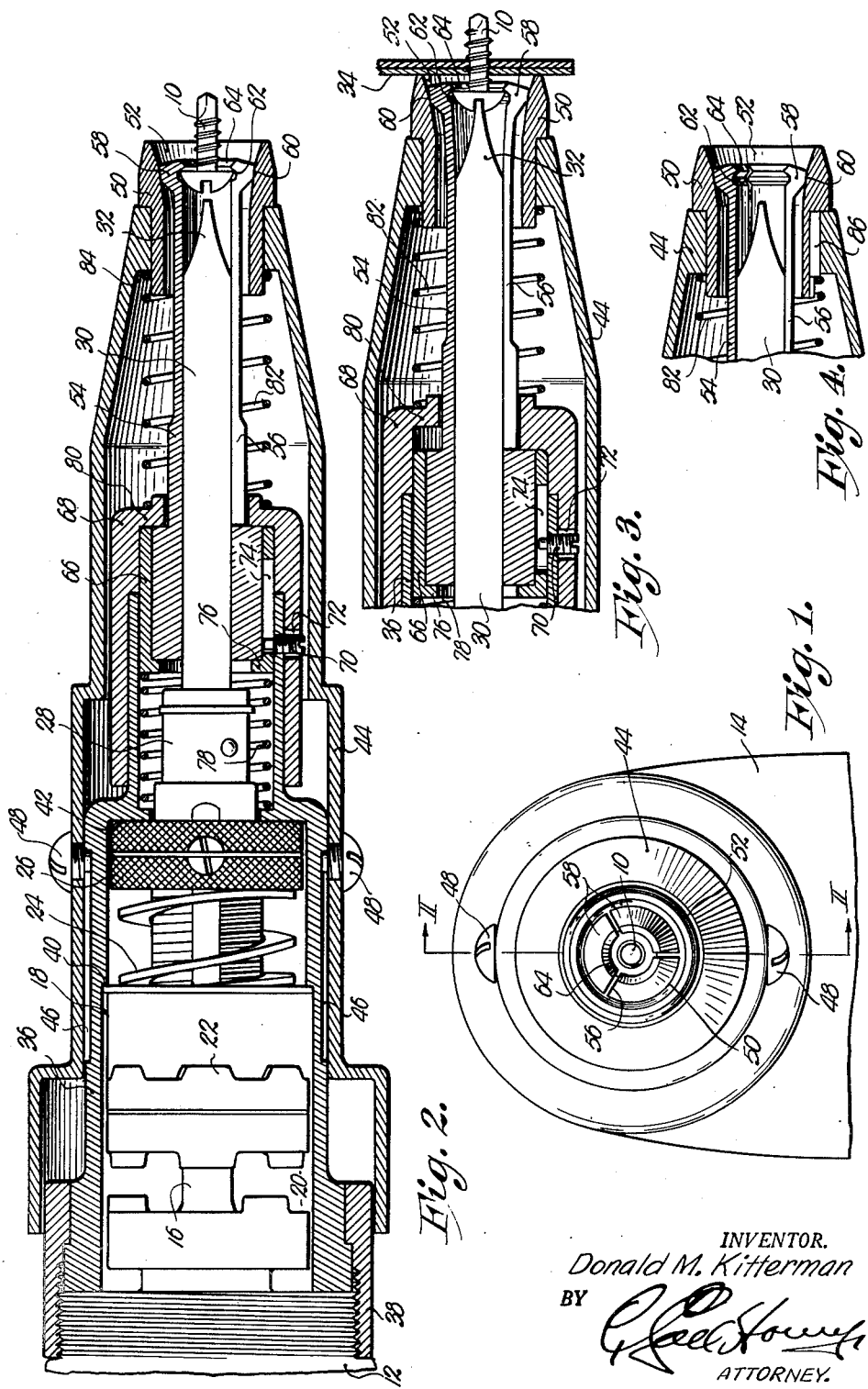
INVENTOR.
Donald M. Kitterman
BY
ATTORNEY.

Patented Nov. 10, 1953

2,658,538

UNITED STATES PATENT OFFICE 2,658,538

SCREW-RETAINING CLAMP FOR POWER-DRIVEN SCREW DRIVERS

Donald M. Kitterman, Kansas City, Kans.

Application October 29, 1951, Serial No. 253,689

4 Claims. (Cl. 144—32)

This invention relates to improvements in retaining clamps and particularly to those types of devices wherein a screw or the like is driven through the medium of a power tool, the primary object being to provide a screw-retaining or holding clamp capable of automatic release as the screw is driven into place.

In my copending application, Serial No. 211,745, filed February 19, 1951, there is disclosed a self-drilling screw, i. e. one that is capable of boring its own opening as the same is forced into place.

It is the most important object of the present invention therefore, to provide a power tool for driving such screw and having as a part thereof, a retaining clamp to hold the screw while the same is being rotated.

While the clamp hereof may have many uses other than that to be hereinafter set forth, it is an important object of this invention to provide means in the nature of a reciprocable socket member having an inclined inner wall capable of maintaining a plurality of chuck jaws in holding or clamping relationship to a screw or the like being manipulated.

It is a further object of the present invention to provide a screw-retaining clamp adapted for mounting upon power driven screw drivers that includes a tubular housing reciprocable on the casing of the prime mover for the power driven apparatus, the housing in turn being provided with an internal truncated, conical wall adapted to releasably hold a plurality of chuck jaws in an operating position relative to the screw or the like which the same is to hold.

A further object of the present invention is to provide a screw-retaining clamp wherein the aforesaid tubular housing normally extends outwardly beyond the chuck jaws to engage the work in which the screw is applied for automatically releasing the jaws as the screw is completely tightened.

Another object hereof is to provide in a screw retaining clamp as above set forth, a member having the clamping jaws thereon, which member is in turn reciprocable relative to the screw driver bit, thereby rendering the bit itself reciprocable toward and away from the screw retained by the jaws.

Other objects include many details of construction, all of which will be made clear as the following specification progresses.

In the drawing:

Figure 1 is an end elevational view of a screw-retaining clamp for power driven screw drivers made pursuant to the present invention.

Fig. 2 is a longitudinal, cross-sectional view taken on line II—II of Fig. 1.

Fig. 3 is a fragmentary, sectional view similar to Fig. 2 on a reduced scale and illustrating the position of the retaining clamp as the same releases its hold upon the screw; and Fig. 4 is a fragmentary, sectional view still further reduced and similar to Fig. 2 illustrating a slightly modified form of the invention.

As above indicated, the retaining clamp of the present invention has been adapted particularly for holding and driving screws 10 of the kind disclosed in my aforesaid copending application.

It is difficult to hold a self-drilling screw while driving the same and in accordance with the present invention as will hereinafter become clear, screw 10 is held and automatically released as the same approaches the position illustrated in Fig. 3 of the drawing.

The retaining clamp for screw 10 is adapted for mounting upon power driven screw drivers including an electric motor enclosed within a casing 12, provided with a handle 14 and a finger-controlled electric switch not shown. The electric motor has a drive shaft 16 extending outwardly beyond one end thereof for rotating a driven assembly broadly designated by the numeral 18.

The assembly 18 is slidable on the shaft 16 to interengage a clutch 20 having interlocking parts on the drive shaft 16 and the assembly 18 respectively. A slip clutch 22 is yieldably held interlocked by a compression spring 24 bearing against an adjustable nut 26 for varying the tension of spring 24. The assembly 18 is also provided with any suitable conventional means 28 for releasably receiving a screw driver shank 30, having a bit 32. It is thus seen that when screw 10 is brought to bear against work 34, and casing 12 moved in a direction toward the work 34, the clutch 20 will become locked as soon as bit 32 engages screw 10.

A spring, not shown, carried by the assembly 18, bears against the proximal end of drive shaft 16 to yieldably hold the clutch 20 disengaged as shown in Fig. 2. The assembly 18 including clutch 22, spring 24, nut 26, holding means 28 and a portion of shank 30, as well as the shaft 16 and the clutch 20, are mounted within an innermost tubular housing 36 releasably attached to the casing 12 by means of a nut 38, assembly 18 therefore, being rotatable within housing 36 and reciprocable therein toward and away from the casing 12 and toward and away from shoulders 40 and 42 in the housing 36.

In accordance with the present invention, an outermost tubular housing 44 is telescoped on the nut 38 and the housing 36 for rectilinear, reciprocable movement on the longitudinal axis of the shank 30. A pair of opposed grooves 46 are formed in the housing 36 for receiving set-screws 48, carried by the housing 44 and slidable within the grooves 46 to guide housing 44 and restrain the same against rotative movement relative to the housing 36. That end of the housing 44 remote from casing 12, receives a tubular socket member 50 provided with an annular truncated, innermost conical wall 52 that circumscribes the screw 10. The shank 30 in turn receives an elongated, tubular member 54 of resilient material split longitudinally as at 56 to present a plurality of chuck jaws 58 within the socket member 50. Jaws 58 each have inclined, outermost surfaces 60 that bear against the wall 52, socket member 50 being slidable relative to the jaws 58. An internal annular groove 62 in the member 54 and particularly in the jaws 58, receives the head of screw 10 in the manner illustrated in Fig. 2 and an inclined, outermost edge 64 on the jaws 58 facilitates insertion of the head of screw 10.

The tubular member 54 terminates adjacent the innermost end of the shank 30 and has a tubular sleeve 66 circumscribing the same and partially disposed within the innermost housing 36. A tubular collar 68 circumscribes a portion of the housing 36 and a portion of the sleeve 66, as well as a portion of the member 54. A screw 70 passing through an opening 72 in the collar 68, holds the latter against displacement relative to the housing 36.

Sleeve 66 is reciprocable within the housing 36 and restrained against rotation relative thereto by means of screw 70 extending into a slot 74 within sleeve 66. An inturned, annular flange 76 on the sleeve 66, bears against the proximal end of member 54, and a spring 78 coiled about holding means 28 within the housing 36, bears against the flange 42 and flange 76 to yieldably hold the sleeve 66 biased against inturned flange 80 on collar 68 and to yieldably hold the shank 30 biased toward the screw 10. A spring 82 coiled about the member 54 is interposed between the flange 80 of collar 68 and an annular shoulder 84 on the housing 44 to hold the latter biased away from the casing 12.

All of the aforementioned parts are normally in the position illustrated in Fig. 2 of the drawing. To insert the screw 10 within the annular groove 62, the operator shifts the housing 44 on the socket member 50 toward the casing 12, against the action of spring 82, thereby releasing jaws 58 which spring outwardly because of the inherent resiliency of the material from which the member 54 is made. After the insertion of screw 10, as shown in Fig. 2, the housing 44 and socket member 50, are released, spring 82 operating to move socket 50 into tight engagement with the beveled surfaces 60 of jaws 58. As soon as the operator handling the tool and particularly grasping the handle 14 in casing 12, moves the screw 10 into engagement with work 34 and applies pressure, the shank 30 will move on its longitudinal axis toward the screw 10 against the action of spring 78 until the bit 30 engages the kerf of the head of screw 10. As continued pressure is applied, shaft 16 is moved toward the assembly 18 until clutch 20 is engaged. Thereupon, by energizing the motor within casing 12, shaft 16, assembly 18, shank 30, bit 32 and screw 10, are rotated relative to casing 12, housings 36 and 44, springs 78 and 82, sleeve 66 and collar 68. As soon as socket member 50 comes into engagement with the work 34, and as continued pressure is applied by the operator, housing 44 and socket member 50 will be shifted on the longitudinal axis of the rotating shank 30, toward the casing 12 as setscrews 48 ride in the grooves 46. Such movement of the socket member 50 releases the jaws 58 which spread apart as the beveled edges 60 approach the outermost peripheral edge of the socket member 50 and by the time that screw 10 is completely driven into the work 34, the chuck jaws 58 will have completely released their hold on the head of screw 10. When the tool is moved away from the work 34 and the screw 10, the parts will assume the positions shown in Fig. 2 with bit 32 held spaced away from the jaws 58 by the action of spring 78, it being noted in Fig. 3 that bit 32 moves to a position where jaws 58 substantially surround the same as screw 10 is driven to the innermost end of its path of travel within work 34.

In some instances, it may be undesirable for the socket member 50 to be rotated on the work 34, thereby marring the same.

Thus, in accordance with the provisions of the modification of Fig. 4 of the drawing, a key 86 may be provided between the housing 44 and the socket member 50 to hold the latter against rotation relative to the housing 44 and therefore, against rotation as the shank 30 tends to rotate member 54.

It is still further apparent to those skilled in the art, that the socket member 50 may be made integral with housing 44, or the truncated wall 52 may be formed in the housing 44. It can now be well appreciated that the improvements hereof might well be used in connection with tools other than power driven screw drivers and for purposes other than holding and driving self-drilling screws or other types of fastening elements that must be held while rotated.

It is also apparent that one of the outstanding features of the present invention is the protrusion of the socket member 50 beyond the jaws 58 where the same will in fact come into contact with the work 34 and thereby operate to release the jaws 58 as pressure is applied.

While for the most part, the inherent resiliency of the material from which member 54 is made, will be sufficient to cause jaws 58 to separate from the head of screw 10, the arcuate cross-sectional contour of the groove 62, aids in causing the jaws 58 to slip from place as the head of screw 10 approaches the work 34.

On the other hand, the provision of groove 62 and its cross-sectional contour is of extreme importance in holding screw 10 in place when the tool is in the condition shown in Fig. 2. The device will not operate unless the head of the screw 10 is engaged by the jaws 58 not only on the flat face thereof but in substantial line contact with the arcuate face of the head of the screw. A substantial arcuate cross-sectional contour in groove 62 has proved successful but if more precision is desired then, forming the groove 62 to conform in cross-section substantially with the shape of the screwhead, would be preferred.

Many details of construction have hereinabove been necessarily set forth for a full understanding of the construction and use of the retaining clamp hereof, and it is, therefore obvious that many changes and modifications may be made within the spirit of the invention without departing from the scope of the appended claims.

Having thus described the invention what is claimed as new and desired to be secured by Letters Patent is:

1. In a screw driving assembly having a motor casing, a primary housing secured to the casing, a motor shaft in the casing, a screw driver shank having a bit on one end thereof and extending into the housing at its opposite end, and means in the housing for operably connecting the shank with the shaft, the improvement of which comprises an outer housing telescoped at one end thereof over the primary housing and surrounding the bit at its opposite end, a tubular socket element in said opposite end of the outer housing and having an annular, truncated, innermost conical wall; a longitudinally split, tubular member of resilient material extending into the primary housing at one end thereof and provided with screw-head engaging jaws at its opposite end, said tube being telescoped on the shank and said jaws having inclined outer surfaces engaging said wall, said outer housing being longitudinally reciprocable on the primary housing for movement of the socket element to a position releasing the jaws; a first spring coiled about the member within the outer housing between the latter and the primary housing for yieldably holding the wall biased against said surfaces, said member being longitudinally reciprocable on the shank for movement of the latter to a position where its bit engages a screw held by the jaws; and a second spring in the primary housing between the latter and the member for yieldably holding the shank retracted within the member.

2. In a screw driving assembly as set forth in claim 1 wherein is provided means interconnecting the housings for holding the same against relative rotation.

3. In a screw driving assembly having a motor casing, a primary housing secured to the casing, a motor shaft in the casing, a screw driver shank having a bit on one end thereof and extending into the housing at its opposite end, and means in the housing for operably connecting the shank with the shaft, the improvement of which comprises an outer housing telescoped at one end thereof over the primary housing and surrounding the bit at its opposite end, a tubular socket element in said opposite end of the outer housing and having an annular, truncated, innermost conical wall; a longitudinally split, tubular member of resilient material extending into the primary housing at one end thereof and provided with screw-head engaging jaws at its opposite end, said tube being telescoped on the shank and said jaws having inclined outer surfaces engaging said wall, said outer housing being longitudinally reciprocable on the primary housing for movement of the socket element to a position releasing the jaws; a collar mounted on the primary housing and surrounding the member within the outer housing; a first spring coiled about the member within the outer housing between the latter and the collar for yieldably holding the wall biased against said surfaces, said member being longitudinally reciprocable on the shank for movement of the latter to a position where its bit engages a screw held by the jaws; a sleeve mounted on the member within the primary housing and the collar; and a second spring in the primary housing between the latter and the sleeve for yieldably holding the shank retracted within the member.

4. In a screw driving assembly as set forth in claim 3 wherein is provided means interconnecting the collar, the primary housing, and the sleeve for holding the same against relative rotation.

DONALD M. KITTERMAN.

References Cited in the file of this patent

UNITED STATES PATENTS

| Number | Name | Date |
|---|---|---|
| 1,807,264 | Walker | May 26, 1931 |
| 2,061,086 | Nord | Nov. 17, 1936 |
| 2,150,343 | Schieber | Mar. 14, 1939 |
| 2,175,299 | Malvin | Oct. 10, 1939 |
| 2,272,279 | Schindel | Feb. 10, 1942 |
| 2,334,088 | Haas et al. | Nov. 9, 1943 |
| 2,373,992 | Billinghurst | Apr. 17, 1945 |
| 2,435,137 | Geertsema | Jan. 27, 1948 |
| 2,564,345 | Shaff | Aug. 14, 1951 |
| 2,625,967 | Stull | Jan. 20, 1953 |